(12) United States Patent
Ivey

(10) Patent No.: US 11,005,338 B2
(45) Date of Patent: May 11, 2021

(54) ELECTRICITY GENERATOR

(71) Applicant: Bradford Ivey, East Orange, NJ (US)

(72) Inventor: Bradford Ivey, East Orange, NJ (US)

( * ) Notice: Subject to any disclaimer, the term of this patent is extended or adjusted under 35 U.S.C. 154(b) by 0 days.

(21) Appl. No.: 16/899,440

(22) Filed: Jun. 11, 2020

(65) Prior Publication Data
US 2020/0303992 A1    Sep. 24, 2020

Related U.S. Application Data

(63) Continuation-in-part of application No. 15/856,272, filed on Dec. 28, 2017, now abandoned.

(51) Int. Cl.
*H02J 7/00* (2006.01)
*H02K 7/18* (2006.01)
*H02J 7/34* (2006.01)

(52) U.S. Cl.
CPC ............ *H02K 7/1807* (2013.01); *H02J 7/005* (2020.01); *H02J 7/0063* (2013.01); *H02J 7/345* (2013.01)

(58) Field of Classification Search
CPC ........ H02J 7/1807; H02J 7/005; H02J 7/1476; H02J 3/40; H02J 7/1423; H02J 7/1438; H02K 7/1807; H02K 53/00; H02K 47/00; H02K 47/14; H02K 7/025; Y10S 310/00; Y10S 903/906; Y10S 322/00; Y10T 29/53143; Y10T 307/313; H04W 52/0296

USPC .......................................................... 307/19
See application file for complete search history.

(56) References Cited

U.S. PATENT DOCUMENTS

| | | | | |
|---|---|---|---|---|
| 2006/0215727 | A1* | 9/2006 | Hampton | F24H 9/20 373/147 |
| 2010/0253147 | A1* | 10/2010 | Ogg | H02J 9/061 307/65 |
| 2012/0286572 | A1* | 11/2012 | Tracy | H02K 53/00 307/19 |
| 2014/0288749 | A1* | 9/2014 | Dumrongkietiman | B60L 7/18 701/22 |
| 2015/0188400 | A1* | 7/2015 | Kemp | H02K 53/00 310/74 |
| 2020/0041571 | A1* | 2/2020 | Propp | G01R 15/186 |

* cited by examiner

*Primary Examiner* — Toan T Vu
(74) *Attorney, Agent, or Firm* — Kaplan Law Practice, LLC; Joshua Kaplan, Esq

(57) ABSTRACT

The present invention is a compact generator. It utilizes a combination of electrical motors to provide current producing oscillations of a direct current or induction generator. The combination is designed to work as real time backup to each other or as a parallel electric production for optimal output level of electricity. The disclosed electrical generation system may contain fallback mechanisms for power generations using electrical motors connected to other battery packs or to a solar panel. An internal combustion engine having a completely closed cooling and fuel supply is also disclosed.

1 Claim, 1 Drawing Sheet

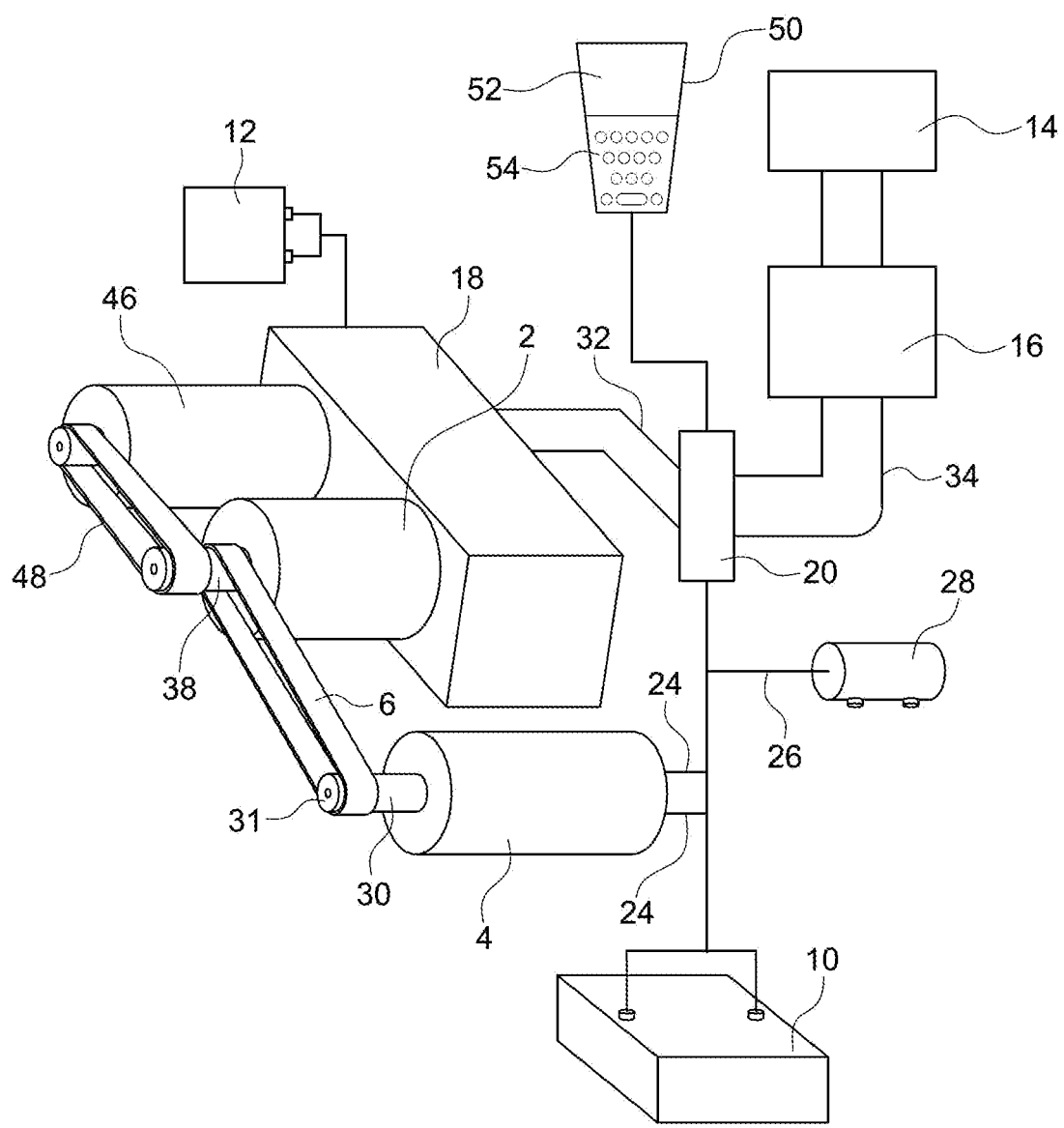

ELECTRICITY GENERATOR

CLAIM OF PRIORITY

This application claims priority of U.S. application Ser. No. 15/856,272, filed on Dec. 28, 2017, the contents of which are fully incorporated herein by reference.

FIELD OF THE INVENTION

The present invention relates to personal or small-scale electric generators capable of providing backup power to occupants of small apartment units.

BACKGROUND OF THE INVENTION

The disclosed device aims to provide a compact source of backup electricity to residents of apartment units. Occupants of apartments are often at the mercy of the building grid, and most residential buildings are presently not equipped with a central backup generator.

The idea of a generator has been introduced just before WWII and has since then been implemented within critical uptime environments, such as hospitals, central processing shops and military equipment, namely, navy vessels. After the war, commercial building managers and owners began deploying backup generators in factories and office buildings. The technology was relied upon until recently to mitigate supply shortages during peak consumption periods. Presently a backup generator is part of a standard office equipment in most commercial settings. The generators in a commercial setting are usually large, noisy, fume belching contraptions, designed to produce a large output of current to match the power levels supplied by the grid.

As the generator technology continued to improve, small portable gasoline generators, began to be mass produced for the residential consumer market. While these represent the compact version of their large commercial cousins, they nevertheless retained some undesirable qualities of the former and are therefore unsuitable for indoor deployment. For the most part, private portable generators are still quite large, produce a lot of noise and noxious fumes. Furthermore, they are designed to provide sufficient electric output to power a small residential house and will provide excess power in a minimalistic setting of an urban apartment.

A generator for an apartment unit, must be small enough to fit in a hallway closet, such as a towel closet, which by its placement is usually the smallest closet in an apartment unit. An indoor unit must also minimize noise and eliminate indoor emissions of fumes. Several fuel sources are available to an indoor unit, namely, rechargeable batteries, solar fuel cell or propane. Such a generator may function well despite necessarily small size, since most other home appliances will be equally compact and economical.

Furthermore, in the preferred embodiment of the invention that has been disclosed in the FIGURES, the generator attempts to maximize electricity generated from a single generator by doubling the amount of generator devices being used. In so doing a small generator, producing zero emissions, will be able to account for a considerable production of electricity.

SUMMARY OF THE INVENTION

The disclosed device is a closet generator that is designed to serve as a backup generator during a power outage. The generator is wired into the main grid supply line to charge onboard batteries while the grid is operating normally. If the current flow over the grid drops, a switch over which the generator has been connecting to the grid is tripped to power the generator and restore electricity to the internal circuitry of the apartment unit.

The generator motor may be powered solely by a battery pack. It may also have a connection to an external solar panel that is wired to either recharge the batteries or to provide current directly to the generator. The generator may have an internal combustion component that is be fueled through a connection to a source of propane, along with a sealed exhaust path to remove fumes.

In all embodiments, the generator will attempt to recharge its batteries during operation with a connection to an alternator.

BRIEF DESCRIPTION OF THE DRAWINGS

FIG. 1 demonstrates the preferred embodiment of the present invention.

DESCRIPTION OF THE PREFERRED EMBODIMENTS

The preferred embodiments of the present invention will now be described with reference to the drawings. Identical elements in the various FIGURES are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1 demonstrates the preferred embodiment of the disclosed invention. Shown is the electric generator 2, connected using a drive belt 6 to an electrical motor 4. The electrical motor 4 receives its power from a battery 10. In an alternative embodiment, power to the electric motor 4 may originate from a solar panel, or a solar panel in combination with the battery 10. The electrical motor 4 provides the rotational torque to the shaft 38, which is used to build a flow of current inside the generator 2. The current then flows out of circuitry 32 to the grid 14, or any other electrical load.

The configuration disclosed in FIG. 1 is designed to serve as a compact indoor generator, which can power critical appliances and electrical devices during a power outage. These devices range from charging a battery on a mobile phone to running residential appliances, such as, a refrigerator, a washer/drier, space heater, air conditioning or a range. The disclosed generator can also fulfill such critical functions as providing a backup power to an oxygen ventilator, a baby monitor, or a closed-circuit surveillance system.

The disclosed, system is connected to the grid via connector 14. While the grid via connector 14 is properly energized, the switch 16 sends current over the transformer switch 20 to the battery 10. The transformer switch 20 detects when the battery 10 reaches the proper voltage level across its terminals, and at that point interrupts the flow of current to the battery 10.

The load measuring sensor 28 detects the voltage pressure presented by the battery 10 and signals to shutoff or resume recharging current to the battery 10 from either the grid via connector 14 or the generator 7. The load measuring sensor 28 also reports the health of the battery 10 to the status monitor 50.

The shaft of the motor 30 produces the cranking power to spin the drive wheel 31, which is pulling the drivebelt 6. The drivebelt 6 is connected to the shaft 38 of the generator 2. Also connected to the shaft 38 via the drivebelt 48 is the turbine engine or a secondary motor 46.

The secondary motor serves a dual purpose of either serving as a second generator of electricity or as a secondary motor to drive the generator 2. The current generated by either the generator 2 or the secondary motor 46, or both, is passed to the circuitry (between the transformer switch 20 and the stator 18) 32 via the stator 18.

Both switches 16 and 20 work as backups to determine whether electric current on the main grid via connector 14 has been restored. Once electricity has been restored, the transformer switch 20 signals for the stator 18 to cease supplying electricity to the circuitry 34 (between transformer switch 20 and switch 16). Since the components connected to stator 18 will take a little time to stop spinning, the excess current provided by such cooldown spinning (and power up spinning) is stored in the access power capacitor 12, which functions as a rechargeable battery. Any charge accumulated in the access power capacitor 12 is used to recharge the battery when the generator 2 is shut down. The access power capacitor 12 further guards against excessive load produced by the components of the stator 18 and offloads such current, while simultaneously signaling the transformer switch to generate a cooldown cycle for the generator.

The monitoring system 50 monitors the health and maintenance status of all components of the disclosed system and displays them on its screen 52. A user may also specifically request a status or produce maintenance and operational history, as well as to render manual override functionality using the keyboard 52. Each of the disclosed components reports its health status to the transformer switch 20, which in turn relays the information to the monitoring system 50.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A compact indoor electric generator consisting of: a generator, said generator having a rotor and a stator; said generator being connected to an electric motor, wherein said electric motor providing torque to a shaft of said rotor; said generator connecting to a utility grid over a transformer switch which is configured to charge a battery from said utility grid when said utility grid is operating normally and provide power from said generator to a grid connector when said utility grid has failed; wherein said electric motor deriving power from said battery; wherein an electric current generated from a cooldown, a powerup or an excess of power from said generator being stored in a capacitor; wherein said capacitor is configured to signal said cooldown of said generator on detecting of load; a secondary motor, said secondary motor connected to said electric motor using a belted connection; said secondary motor connecting to said stator; and wherein said secondary motor configured to be used in parallel with said generator to generate electric current or as a driver for said generator; a battery sensor, said battery sensor determining a level of electric current being sent and received from said battery; and wherein said battery sensor tracking a health of said battery; a monitoring system, said monitoring system reporting on health of components comprising said indoor electric generator; and wherein said monitoring system is configured to provide manual override commands to a user to control said components comprising said indoor electric generator.

* * * * *